No. 713,105. Patented Nov. 11, 1902.
F. M. JOHNSON.
GOLD SEPARATOR.
(Application filed Mar. 25, 1902.)
(No Model.)
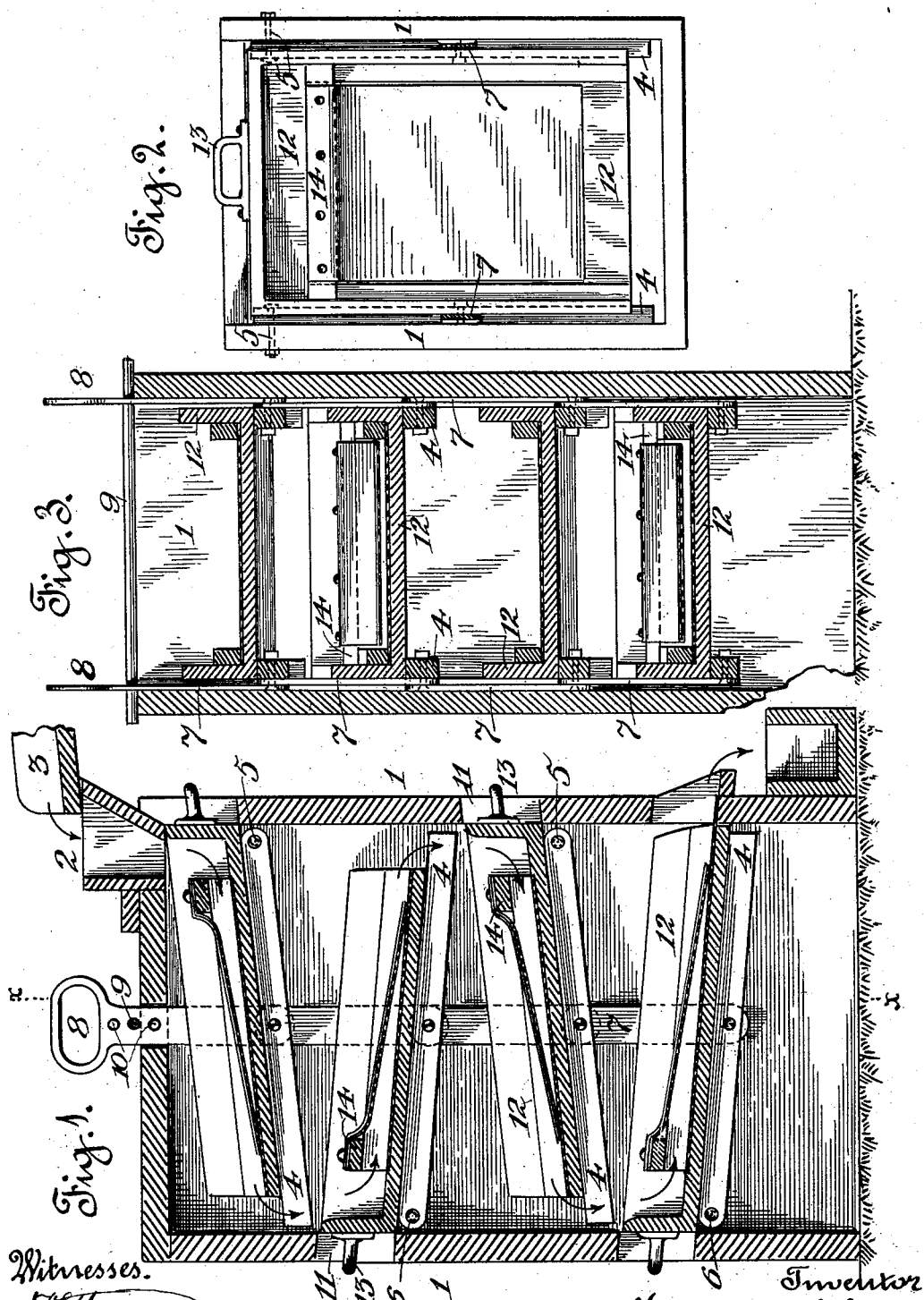
Witnesses.
Inventor.
Frederick M. Johnson
by Spear Seely
Attorneys
THE NORRIS PETERS CO., PHOTO-LITHO., WASHINGTON, D. C.

UNITED STATES PATENT OFFICE.

FREDERICK M. JOHNSON, OF SAN FRANCISCO, CALIFORNIA, ASSIGNOR TO ROSE GOLD RECLAMATION COMPANY, OF SAN FRANCISCO, CALIFORNIA, A CORPORATION OF ARIZONA TERRITORY.

GOLD-SEPARATOR.

SPECIFICATION forming part of Letters Patent No. 713,105, dated November 11, 1902.

Application filed March 25, 1902. Serial No. 99,910. (No model.)

*To all whom it may concern:*

Be it known that I, FREDERICK M. JOHNSON, a citizen of the United States, residing at San Francisco, in the county of San Francisco and State of California, have invented certain new and useful Improvements in Gold-Separators, of which the following is a specification.

My invention relates to the separation of precious particles of mineral from the crushed or pulverized ore or the sand which contains them and which is generally in the form of a pulp of ore and water or sand and water.

My invention is also in some particulars an improvement upon the construction shown and described in an application for patent filed by me May 22, 1901, with the Serial No. 61,433. The construction shown in that application was embodied in a sluice-box of considerable length provided with special holding and retaining devices for causing the separation of precious particles and retaining them. That construction might in some localities, such as the decks of scows and barges, be found somewhat awkward and cumbersome, as taking up too much length where space would be valuable, and my present improvements are designed to supply a separating apparatus which, so far as its separating action is concerned, is substantially like the one described in said application, but embodies improvements in the line of economy in room, as well as facilities for adjustment in use.

In the accompanying drawings, Figure 1 is a vertical longitudinal section of an apparatus containing the said improvements. Fig. 2 is a plan view. Fig. 3 is a vertical cross-section of the same on the line *x x* of Fig. 1.

1 represents a frame, shown here as a substantially rectangular casing, but which may be an open-work structure. At the top is supported a feed hopper or throat 2, supplied from any suitable device, such as the trough 3. Within the box are pivoted oppositely-placed supports 4, arranged in pairs, one pair above another, and the pairs inclining alternately in opposite directions and being pivoted alternately by opposite ends, as shown at 5 6. These supports are intermediately pivoted to, and so supported by, the jointed bars, rods, or links 7, which thus form flexible supporting connections and which project above the top of the frame, where they are supplied with suitable handles, as 8.
They can be connected at the top by a crossbar, bail, or the like, but are here shown as being independently movable. They are locked in position by a transverse rod 9 engaging with holes 10 in said bars above the top of the frame. By raising or lowering the connections 7 all the supports 4 will be adjusted on their end pivots as to inclination, and this adjustment will be simultaneous and uniform throughout the series.

Openings 11 are formed in the casing adjacent to the pivoted ends of the several supports, through which are passed the sluice-boxes 12. The latter when in place rest upon the supports 4, conform to their inclination, and partake of their adjustment. They are preferably provided with handles 13, by which they can be withdrawn.

Each sluice-box is preferably constructed according to the application before referred to. Each is a trough having a covering of burlap, blanket, screen-cloth, or other suitable material upon its bottom, while above said bottom and secured to some suitable support, such as the cross-bar 14, is a flexible apron or floating section of similar material, whose upper surface is made waterproof preferably by a layer of rubber cloth, oil-cloth, or the like resting upon it.

The current of material passing from box to box is compelled to pass beneath the two textile surfaces, the upper of which forces the precious heavier material downward upon the lower, taking up in such action a certain quantity of the finer particles which because of the impervious covering cannot be forced through and washed away. Any of the heavier particles which escape from between the fibrous or textile surfaces pass with the sand and water to the head end of the next sluice-box, where they are treated in the same way, and so on through the series or column of boxes. The inclination of the boxes is regulated according to the quantity and quality of material passing through and in the manner before described, and any box can be conveniently removed and replaced to recover the contents. Any of the boxes can be supplied with amalgamating-surfaces or with sinks or depressions containing amalgamating material.

Having thus fully described my invention, what I claim as new, and desire to secure by Letters Patent, is—

In combination, a suitable casing, a plurality of arms pivoted to each side of the casing, the arms of each side being pivoted alternately at opposite ends, a vertical adjusting-bar arranged centrally on each side connected to all of the arms on its respective side and midway of the length of the arms, and removable trays inserted through openings in the casing and supported on said arms, each tray having a gold-retaining bottom surface, and a cross-bar near its initial end with a flexible apron connected to said cross-bar, substantially as described.

In testimony whereof I have affixed my signature, in presence of two witnesses, this 19th day of February, 1902.

FREDERICK M. JOHNSON.

Witnesses:
L. W. SEELY,
F. M. BURT.